Jan. 1, 1924
L. C. EDWARDS
1,479,380
CUTTER CLEANER FOR FOOD CHOPPERS
Filed April 12, 1923
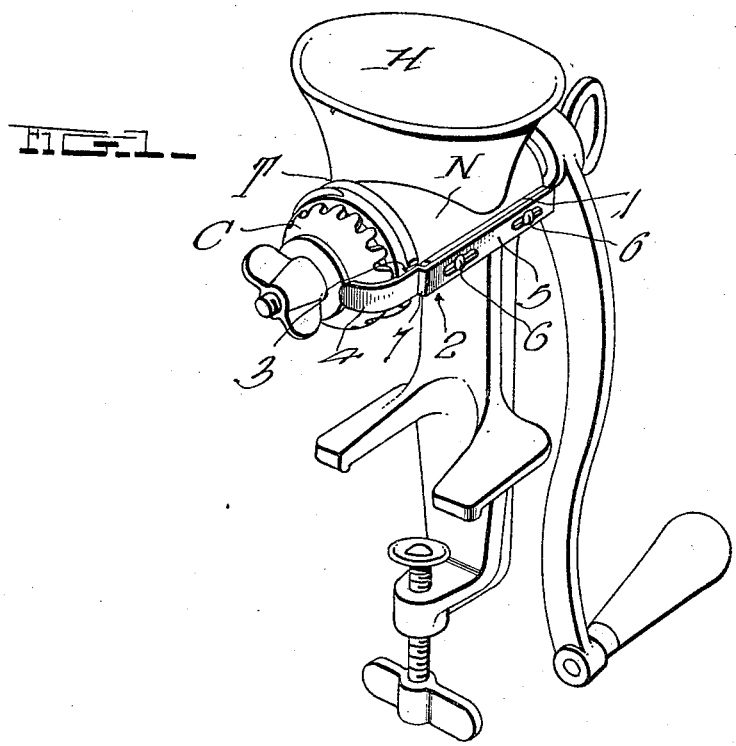
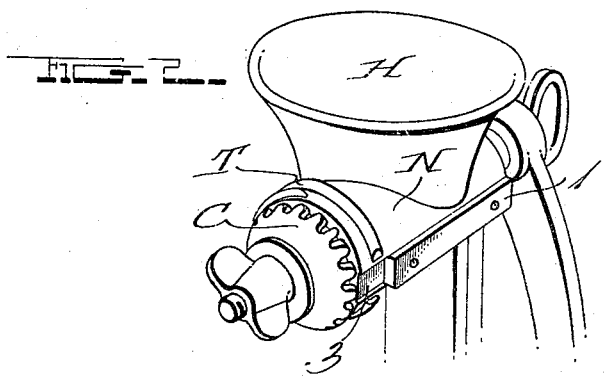
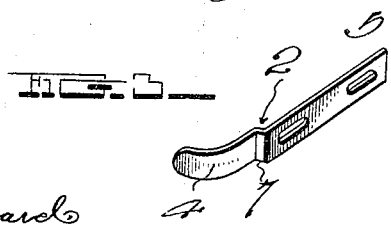
Witness
H. Woodard
Inventor
L. C. Edwards
By H. B. Willson & Co.
Attorneys Patented Jan. 1, 1924.

1,479,380

UNITED STATES PATENT OFFICE.

LOUIS C. EDWARDS, OF ELLINGTON, CONNECTICUT.

CUTTER CLEANER FOR FOOD CHOPPERS.

Application filed April 12, 1923. Serial No. 631,639.

*To all whom it may concern:*

Be it known that I, LOUIS C. EDWARDS, a citizen of the United States, residing at Ellington, in the county of Tolland and State of Connecticut, have invented certain new and useful Improvements in Cutter Cleaners for Food Choppers; and I do declare the following to be a full, clear, and exact description of the invention, such as will enable others skilled in the art to which it appertains to make and use the same.

This invention relates to an improved device which is conveniently termed a cleaner for food choppers, the same being especially, but not necessarily, designed for use in connection with the type of chopper embodying the internal screw carrying a removable externally disposed detachable convex cutting disk adapted to rotate with the screw.

The principal object of the invention is to provide a cleaner which is constructed to co-act with the convex peripheral teeth of the cutting disk, the same being disposed in close proximity thereto and serving to continuously remove the food accumulations therefrom.

An important object of the invention is to provide a cleaner which is shaped to conform to the cutting disk and is adjustably mounted on the chopper to permit it to be moved toward and from the disk to accommodate varying thicknesses of disks.

Another object of the invention is to so cast the chopper that a flattened raised portion is provided for providing effective mounting means for the shank of the cleaner which slidably engages it.

A further object of the invention is to provide a cleaning device which is such in construction that it does not interfere with the usual removable attachments applied to the discharge neck of the hopper.

Other objects and advantages of the invention will be apparent during the course of the following description.

In the accompanying drawings forming a part of this specification and in which like numerals are employed to designate like parts throughout the same:—

Figure 1 is a perspective view of a food chopper equipped with a cleaner constructed in accordance with the invention.

Fig. 2 is likewise a perspective view showing the especially constructed portion of the hopper, the cleaning finger being removed.

Fig. 3 is a detail perspective view of the cleaning finger.

In the drawings for the purpose of illustration, I have shown a conventional type of food chopper which includes, among other details, a hopper H connected to a horizontal cylindrical portion which houses an internal screw (not shown). As is usual, the forward portion of the cylindrical part constitutes a discharge neck N and a cutting disk C co-operates with the discharge neck and is mounted for rotation on the screw. The cutting disk is of course removable and the particular form shown embodies a convexed outer face. Also, the discharge neck is provided with the usual external threads T for accommodating the different attachments customarily used.

The foregoing details are of course old and well known and constitute no part of the invention. However, the particular type of cleaning device which I have devised is especially, but not necessarily adapted for use with a food cutter of this type, but of course by shaping the parts a little differently, the device can be adapted for use in connection with practically any type of chopper. In carrying out the invention I contemplate casting a raised block-like portion 1 on one side of the cylindrical portion of the chopper and this portion constitutes a sliding surface for the removable cleaner 2. It is to be noted that in manufacturing the chopper, the block-like part terminates inward of the extremity of the discharge neck and at this point a comparatively shallow recess 3 is formed and this recess serves a purpose to be hereinafter described. Although the cleaner could be of some other construction, it is preferably formed from a single strip of metal which has its forward portion curved longitudinally to provide a cleaning finger 4 which is adapted to co-act with the toothed periphery of the cutting disk. Inasmuch as these disks are removable to permit substitution of the desired size, I have adjustably mounted the cleaner to accommodate different thicknesses of disks. In carrying out this end the shank 5 of the cleaner rests slidably against the flat surface of the part 1 and the shank is provided with elongated slots and binding screws 6 pass through these slots and serve to hold the cleaner in various adjusted positions. It is to be noted that the shank of the cleaner is off-set with respect to the finger as seen at 7 and a shoulder is thus provided which abuts the forward end of the block 1 to limit the sliding movement of the cleaner in one direction. This also permits the adjacent portion of the cleaning finger to be received in the recess 3. Hence, the surface of the cleaning finger is disposed inward of the external surface of the aforesaid threads T to prevent interference of the cleaner with the application of the usual attachments co-operative with this thread.

From the foregoing description it is obvious that the cleaning device is relatively stationary with respect to the rotary cutting disk and since the finger is disposed in close proximity to the teeth on the periphery thereof, it will be obvious that as the disk rotates, the finger will continuously remove the food accumulations therefrom. If it is desired to remove the cutting disk and to substitute one having larger or smaller teeth, it is obvious that the cleaning blade can be adjusted to accommodate any of the conventional sizes of disks. These and other features and advantages of the invention have been made apparent from the foregoing description and it is therefore believed that a more lengthy description is unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:—

1. The combination with the discharge neck of a food chopper, said neck having an external thread adjacent its free end and being provided in its outer surface with a recess, of a cutter cleaning finger projecting beyond the neck and having its inner end received in said recess to render the outer face of said finger flush with the surface of said neck, whereby to permit the application of accessories to said neck without interference from said finger.

2. A food chopper of the type set forth having an external raised block-like portion on one side, said portion terminating inward of the extremity of the neck of the chopper, there being a recess formed in said neck at the outer end of said portion, and a cleaner having a part slidably connected with said portion and also having a finger received in said recess and projecting beyond said neck for co-action with the cutter.

3. A cutter cleaner comprising a block-like portion, and cleaner including a curved finger and a shank, the latter engaging said portion and being provided with elongated slots, and binding screws carried by said block-portion and extending through said slots.

4. A cleaning device of the type described including a cleaner formed from an elongated strip of metal curved at one end to provide a finger, the opposite end of the strip providing an attaching portion and the latter being laterally off-set with respect to the finger.

In testimony whereof I have hereunto affixed my signature.

LOUIS C. EDWARDS.